(12) United States Patent
Iwasaki et al.

(10) Patent No.: US 8,982,367 B2
(45) Date of Patent: Mar. 17, 2015

(54) INFORMATION PROCESSING APPARATUS, INFORMATION PROCESSING METHOD, AND COMPUTER READABLE MEDIUM

(75) Inventors: Ryouhei Iwasaki, Saitama (JP); Osamu Murakami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 229 days.

(21) Appl. No.: 13/190,073

(22) Filed: Jul. 25, 2011

(65) Prior Publication Data

US 2012/0250041 A1 Oct. 4, 2012

(30) Foreign Application Priority Data

Mar. 29, 2011 (JP) .................................. 2011-072478

(51) Int. Cl.
| | |
|---|---|
| *H04N 1/60* | (2006.01) |
| *G06K 15/00* | (2006.01) |
| *H04N 1/40* | (2006.01) |
| *G06K 15/02* | (2006.01) |
| *G06F 3/12* | (2006.01) |

(52) U.S. Cl.
CPC ............ *G06K 15/1888* (2013.01); *G06F 3/122* (2013.01); *G06F 3/1243* (2013.01); *G06F 3/1247* (2013.01); *G06F 3/1285* (2013.01); *G06K 15/1849* (2013.01); *G06K 15/1856* (2013.01)
USPC ......... 358/1.13; 358/1.9; 358/1.18; 358/1.15; 358/3.24

(58) Field of Classification Search
USPC ........................ 358/1.13, 1.9, 1.18, 3.24, 1.15
See application file for complete search history.

(56) References Cited

U.S. PATENT DOCUMENTS

| 6,331,894 B1* | 12/2001 | Shimizu ....................... 358/1.13 |
|---|---|---|
| 6,441,919 B1* | 8/2002 | Parker et al. ................. 358/1.18 |
| 6,734,872 B1* | 5/2004 | Varga et al. .................... 345/629 |
| 2002/0186409 A1* | 12/2002 | Laverty et al. ............... 358/1.15 |
| 2007/0067346 A1* | 3/2007 | Kakigi ....................... 707/104.1 |
| 2008/0018935 A1* | 1/2008 | Gauthier et al. ............. 358/1.18 |
| 2008/0158590 A1* | 7/2008 | Lim ............................. 358/1.15 |
| 2011/0026082 A1* | 2/2011 | Miyadera et al. ............ 358/3.24 |

FOREIGN PATENT DOCUMENTS

| JP | A-06-183093 | 7/1994 |
|---|---|---|
| JP | A-11-129565 | 5/1999 |
| JP | A-2007-058745 | 3/2007 |

* cited by examiner

*Primary Examiner* — Miya J Cato
*Assistant Examiner* — Temitayo Folayan
(74) *Attorney, Agent, or Firm* — Oliff PLC

(57) ABSTRACT

An information processing apparatus includes a receiving unit, a rasterization processing unit, a saving unit, a detector, a conversion unit, a storage unit, and a removing unit. The receiving unit receives print information described in a page description language. The rasterization processing unit performs a rasterization process of converting the print information into bitmap data. The saving unit saves the bitmap data as cache data for each of objects included in the print information. The detector detects, among the objects included in the print information, an object which is called only once to obtain a detection result. The conversion unit converts, in accordance with the detection result, the object which is called only once for the print information into page data. The storage unit stores the page data. The removing unit removes a command to call, from the saving unit, the object called only once for the print information.

11 Claims, 13 Drawing Sheets

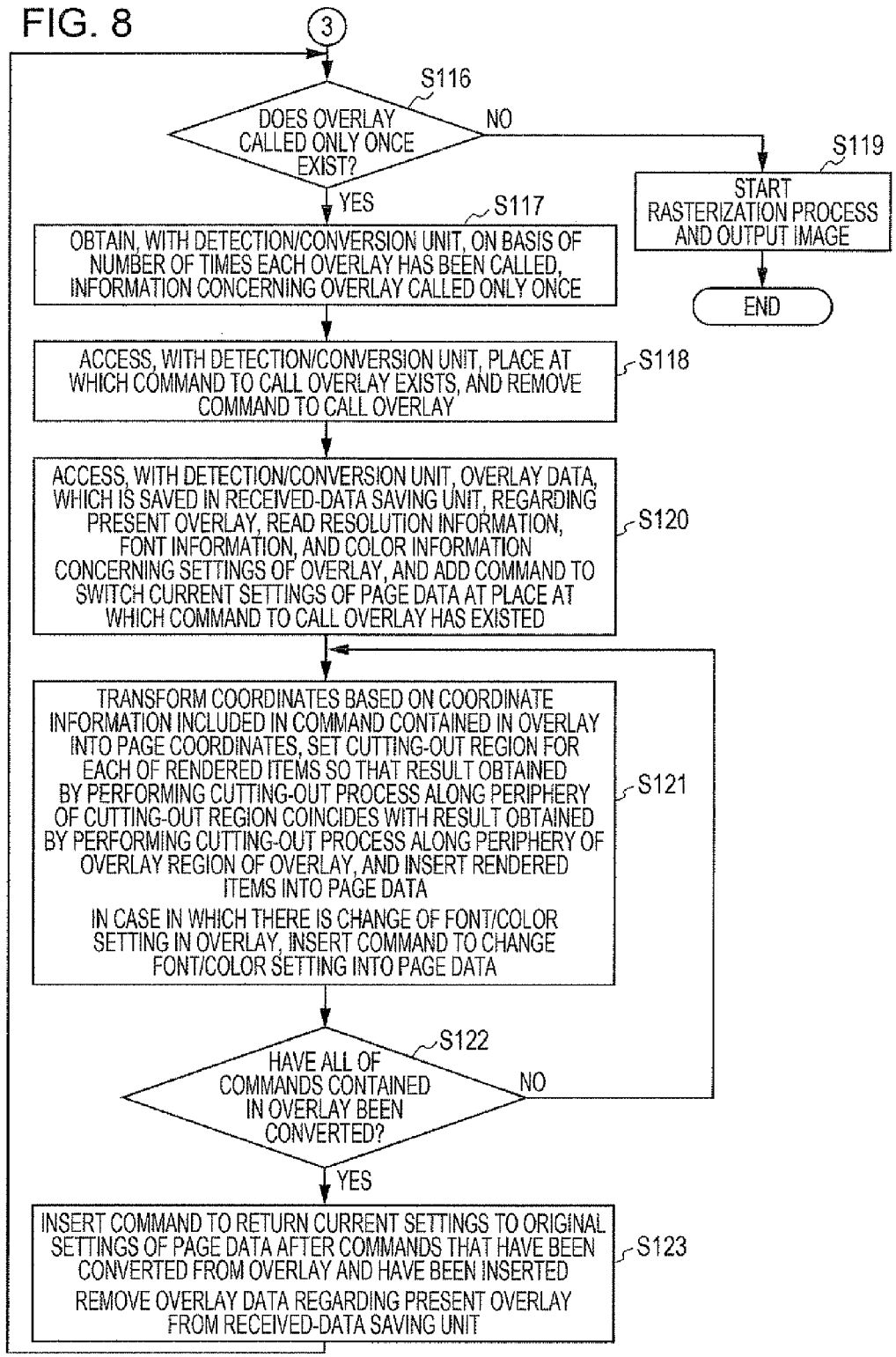

FIG. 9

| OVERLAY NAME | NUMBER OF TIMES OVERLAY HAS BEEN CALLED | PAGE IN WHICH OVERLAY IS CALLED FOR FIRST TIME | RESOLUTION | FONT | COLOR | COORDINATES (x, y) AT WHICH OVERLAY IS PASTED |
|---|---|---|---|---|---|---|
| OVL1 | 1 | 1 | 300 | Font Name: aaa<br>Size: 12 points<br>Angle: zero degrees<br>Italic   off<br>Bold    off | Color Space: CMYK<br>Color Data: xxxx<br>Profile: aaa | (0, 0) |
| OVL2 | 100 | 2 | 300 | Font Name: aaa<br>Size: 12 points<br>Angle: zero degrees<br>Italic   off<br>Bold    off | Color Space: CMYK<br>Color Data: xxxx<br>Profile: aaa | (100, 100) |
| OVL3 | 100 | 2 | 300 | Font Name: aaa<br>Size: 12 points<br>Angle: zero degrees<br>Italic   off<br>Bold    off | Color Space: CMYK<br>Color Data: xxxx<br>Profile: aaa | (100, 500) |
| OVL4 | 50 | 4 | 600 | Font Name: bbb<br>Size: 12 points<br>Angle: zero degrees<br>Italic   off<br>Bold    off | Color Space: CMYK<br>Color Data: xxxx<br>Profile: aaa | (200, 300) |
| ⋮ | ⋮ | ⋮ | ⋮ | ⋮ | ⋮ | ⋮ | ns
INFORMATION PROCESSING APPARATUS, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-072478 filed Mar. 29, 2011.

BACKGROUND (i) Technical Field

The present invention relates to an information processing apparatus, an information processing method, and a computer readable medium storing a program.

(ii) Related Art

A printer controller that is mounted in a high-speed printer or the like and that serves as one type of an information processing apparatus performs, typically, a so-called rasterization process of converting data (print information) described in a page description language into bitmap data.

As a technique for increasing a speed at which the rasterization process is performed, form overlay printing in which printing is performed so that form data and print information are superimposed on each other is known.

In other words, the rasterization process is once performed on an object that is specified as a form to obtain rasterized data, and the rasterized data is saved. When the same object is specified again, the saved data is utilized without performing the rasterization process, thereby realizing an increase in the speed.

In the form overlay printing of the related art, even for an object that is used only once, when the object is specified as form data, rasterized data is saved. Accordingly, this leads to wasteful consumption of a cache region.

In order to reduce the consumption of the cache region, it is considered that application software or the like which generates data described in a page description language is designed so as not to specify, as a form, an object that is used only once.

However, in order to effectively utilize existing print data, it is desirable that the amount of consumption of the cache region be controlled on a print-control-software side or on a printer-controller side.

SUMMARY

According to an aspect of the invention, there is provided an information processing apparatus including a receiving unit, a rasterization processing unit, a saving unit, a detector, a conversion unit, and a storage unit, and a removing unit. The receiving unit receives print information described in a page description language. The rasterization processing unit performs a rasterization process of converting the print information into bitmap data. The saving unit saves the bitmap data, which has been generated using the rasterization process, as cache data for each of objects included in the print information. The detector detects, among the objects included in the print information, an object which is called only once. The conversion unit converts, in accordance with a result of detection performed by the detector, the object which is called only once for the print information into page data. The storage unit stores the page data which has been obtained by conversion performed by the conversion unit. The removing unit removes a command to call, from the saving unit, the object which is called only once for the print information.

BRIEF DESCRIPTION OF THE DRAWINGS

Exemplary embodiment(s) of the present invention will be described in detail based on the following figures, wherein:

FIG. 8 is a flow diagram illustrating a continuation of the procedure of the overlay related process;

FIG. 9 is an illustration of an example of a configuration of a table in which the number of times each overlay has been called is listed;

DETAILED DESCRIPTION

Figure 1:
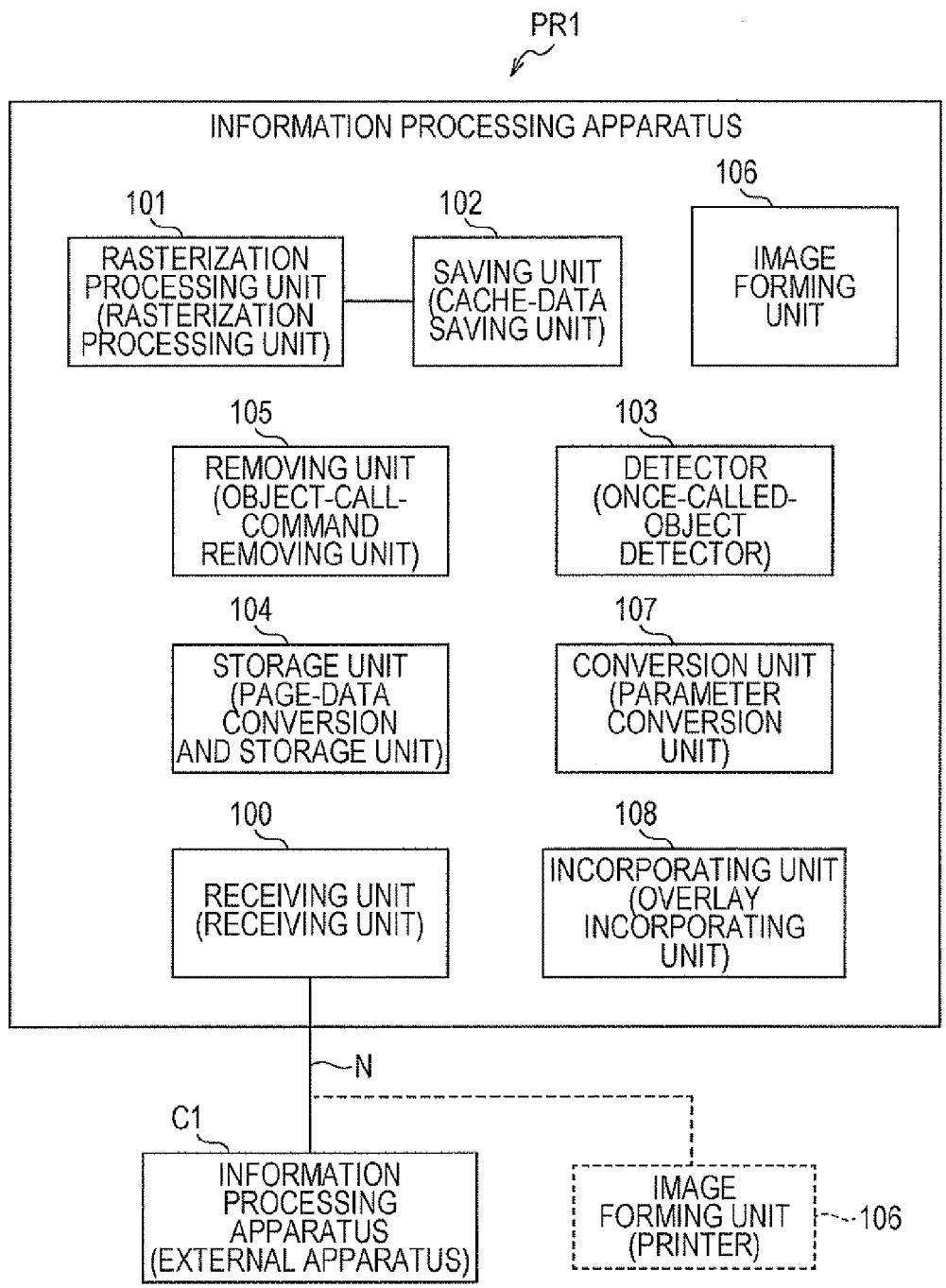
FIG. 1 is a functional block diagram illustrating a functional configuration of an information processing apparatus according to an exemplary embodiment.

Hereinafter, an exemplary embodiment will be described in detail as an example of the present invention with reference to the drawings. Here, in the accompanying drawings, the same members are denoted by the same reference numerals, and a redundant description is omitted. Note that, in the description given below, the exemplary embodiment is provided as only an example of the present invention, and the present invention is not limited to the exemplary embodiment.

An information processing apparatus PR1 according to the exemplary embodiment of the present invention will be described with reference to FIGS. 1 to 13.

First, a functional configuration of the information processing apparatus PR1 will be described with reference to FIG. 1.

The information processing apparatus PR1 according to the present exemplary embodiment is configured, for example, as a high-speed printer that receives, via a network N such as a local area network (LAN), from an information processing apparatus (an external apparatus) C1, print information described in a page description language, and that forms an image on a recording medium, such as roll paper. The information processing apparatus C1 generates the print information, and is configured so as to include, for example, a host computer.

The information processing apparatus PR1 includes a receiving unit 100 (an example of a receiving unit), a rasterization processing unit 101 (an example of a rasterization processing unit), a cache-data saving unit 102 (an example of a saving unit), a once-called-object detector 103 (an example of a detector), a page-data conversion and storage unit 104 (an example of a conversion unit and a storage unit), an object-call-command removing unit 105 (an example of a removing unit), and an image forming unit 106. The receiving unit 100 receives print information described in a page description language. The rasterization processing unit 101 performs a rasterization process of converting the print information into bitmap data. The cache-data saving unit 102 saves the bitmap data, which has been generated using the rasterization process, as cache data, for each of objects included in the print information. The once-called-object detector 103 detects an object that is called only once among the objects included in the print information to obtain a detection result. In accordance with the detection result, the page-data conversion and storage unit 104 converts the object that is called only once for the print image into page data, and stores the page data. The object-call-command removing unit 105 removes a command to call the object that is called only once for the print information. The image forming unit 106 is configured so as to include, for example, a printer engine that performs image forming on the basis of the bitmap data, the cache data, and the page data.

Note that, as illustrated using the dot and dash line, the image forming unit 106 may be configured so as to include a printer that is connected via the network N (see a second exemplary embodiment described below).

Furthermore, the information processing apparatus PR1 includes a parameter conversion unit 107 (an example of a parameter conversion part) and an overlay incorporating unit 108 (an example of an incorporating part). When the object that is called once is an overlay that is to be subjected to form overlay printing in which form data and print information are superimposed on each other, the parameter conversion unit 107 converts a parameter associated with the overlay into a parameter compatible with page data. Using the parameter that has been obtained by conversion performed by the parameter conversion unit 107 and that is compatible with page data, the overlay incorporating unit 108 incorporates the overlay into page data.

Then, in the information processing apparatus PR1 according to the present exemplary embodiment, the object-call-command removing unit 105 may not remove the command to call the object that is called only once for print information that satisfies a pre-set condition.

Here, the pre-set condition may be a condition where the number of pages included in the print information is equal to or smaller than a pre-set threshold (for example, ten pages).

Furthermore, in a case of pasting an overlay at a position that is offset from the origin of a page, the overlay incorporating unit 108 may offset a coordinate position that is specified in a render command contained in the overlay, and may incorporate the overlay into the page data.

Moreover, in the information processing apparatus PR1 according to the present exemplary embodiment, when the overlay has a size information and development of the overlay in a page is performed, a cutting-out process of cutting out rendered items contained in the overlay so as to have the sizes in which the rendered items are rendered in the overlay is performed. In this case, the parameter conversion unit 107 may set, in the page data, for each of the rendered items contained in the overlay, a command to cut out the rendered item so as to have the size in which the rendered item is rendered in the overlay, and may convert commands contained in the overlay into page data.

Figure 2:
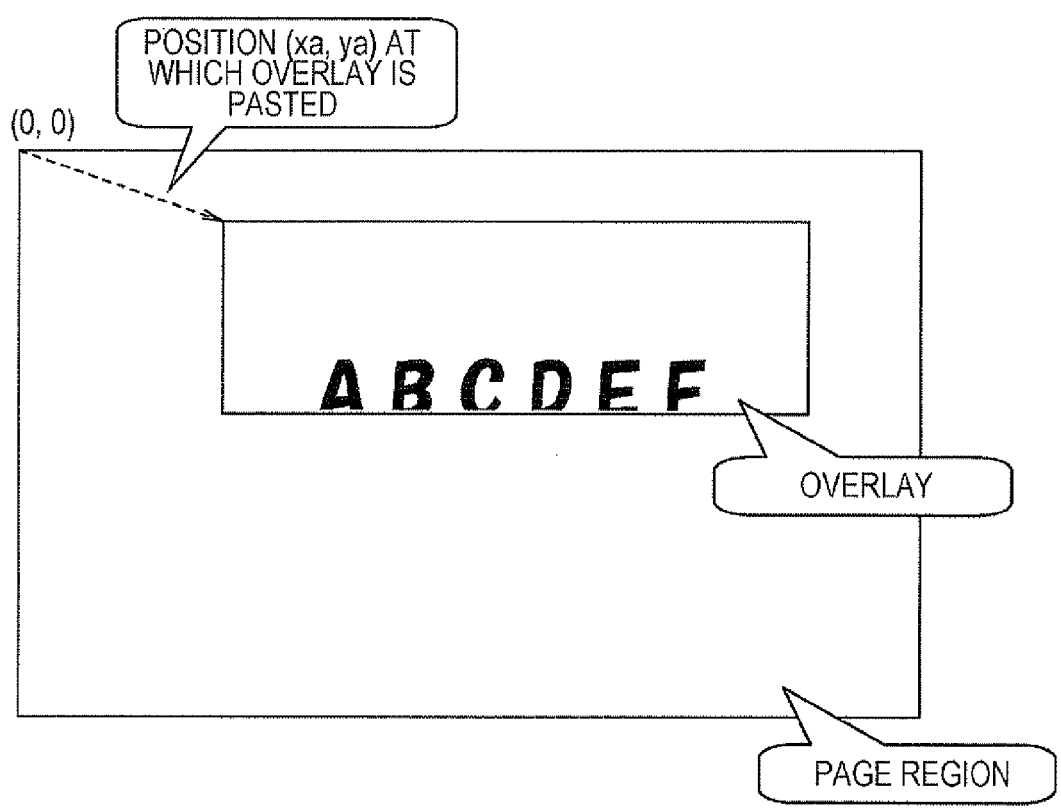
FIG. 2 is an explanatory diagram illustrating an example in which an overlay is pasted on a page.

Regarding an example in which an overlay is pasted, as illustrated in FIG. 2, for example, an overlay is offset from am origin (0, 0) of a page region to coordinates (xa, ya) that are a position at which the overlay is to be pasted, and is pasted.

Furthermore, the contents of an overlay are not particularly limited. The contents of the overlay illustrated in FIG. 3 are provided as an example.

Figure 3:
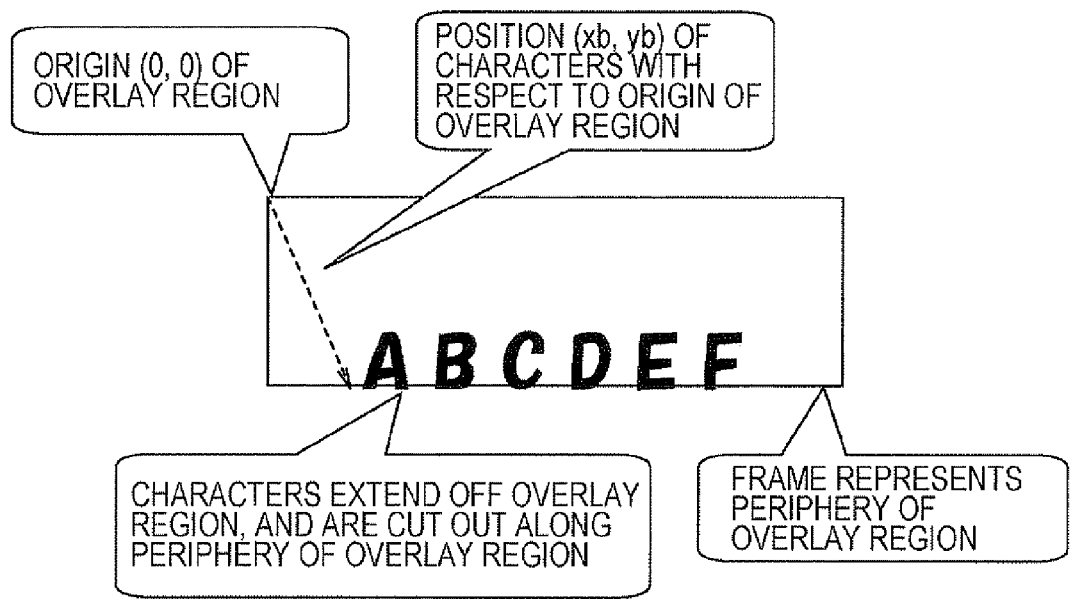
FIG. 3 is an explanatory diagram illustrating an example of the contents of the overlay.

In the example illustrated in FIG. 3, it is supposed that an item (a character string of A, B, C, D, E, and F that is positioned at coordinates (xb, yb) with respect to an origin (0, 0) of an overlay region) contained in the overlay is cut out along the periphery (here, the frame) of the overlay region of the overlay.

Figure 4:
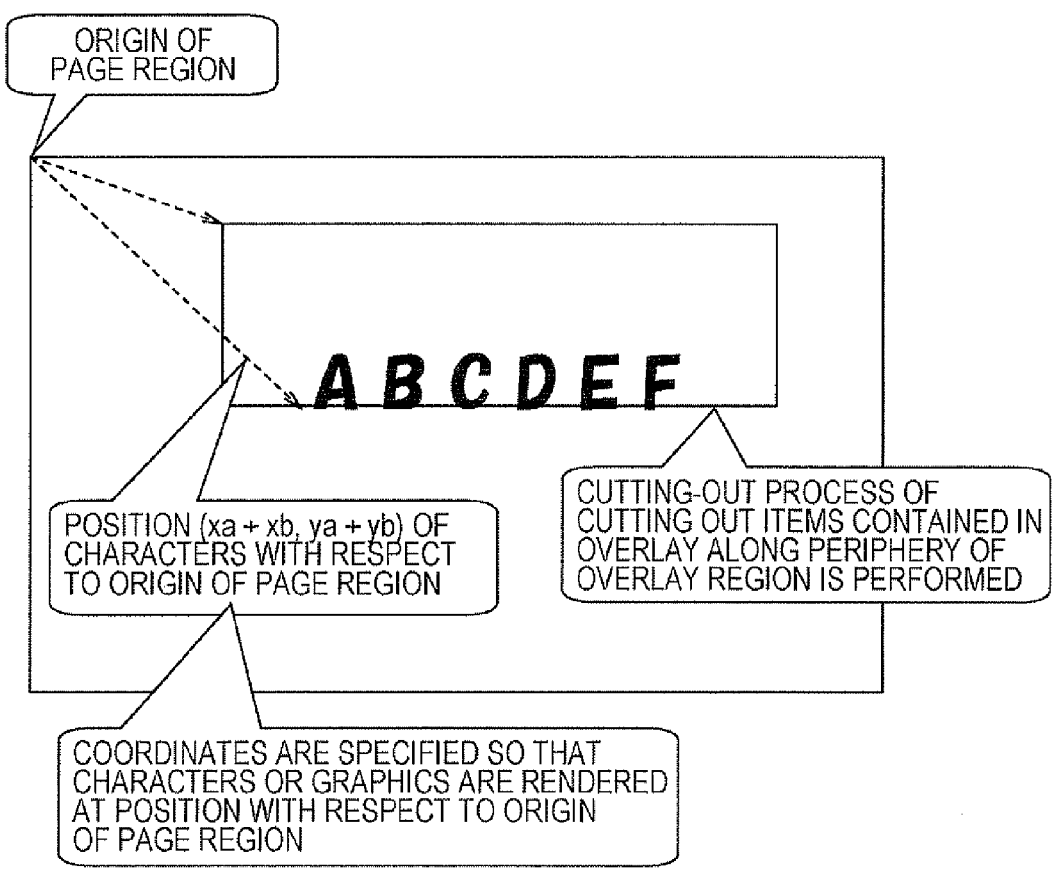
FIG. 4 is an explanatory diagram illustrating an example of conversion from the overlay into page data.

Additionally, regarding an example of conversion performed by the parameter conversion unit 107, as illustrated in FIG. 4, coordinates (xa+xb, ya+yb) corresponding to the position of the character string are specified with respect to the origin (0, 0) of the page region. Conversion is performed so that the item (characters or graphics) is rendered at the position that has been specified with respect to the origin of the page region.

Note that, in this case, coordinate transformation, the cutting-out process, and so forth are performed so that a render result which is the same as a render result obtained by typically performing a process of pasting an overlay can be obtained.

Moreover, when a font setting of page data and a font setting of an overlay are different from each other, the parameter conversion unit 107 and the overlay incorporating unit 108 may incorporate, into the page data, a setting with which the font setting of the page data is switched to the font setting of the overlay, may convert commands contained in the overlay into page data, and may incorporate a command to change from the font setting of the overlay back to the font setting of the page data.

First Exemplary Embodiment

Next, a first exemplary embodiment of the present invention will be described with reference to FIGS. 5 to 9.

An information processing apparatus PR1*a* according to the first exemplary embodiment has a configuration such as the configuration illustrated in the block diagram of FIG. 1.

Figure 5:
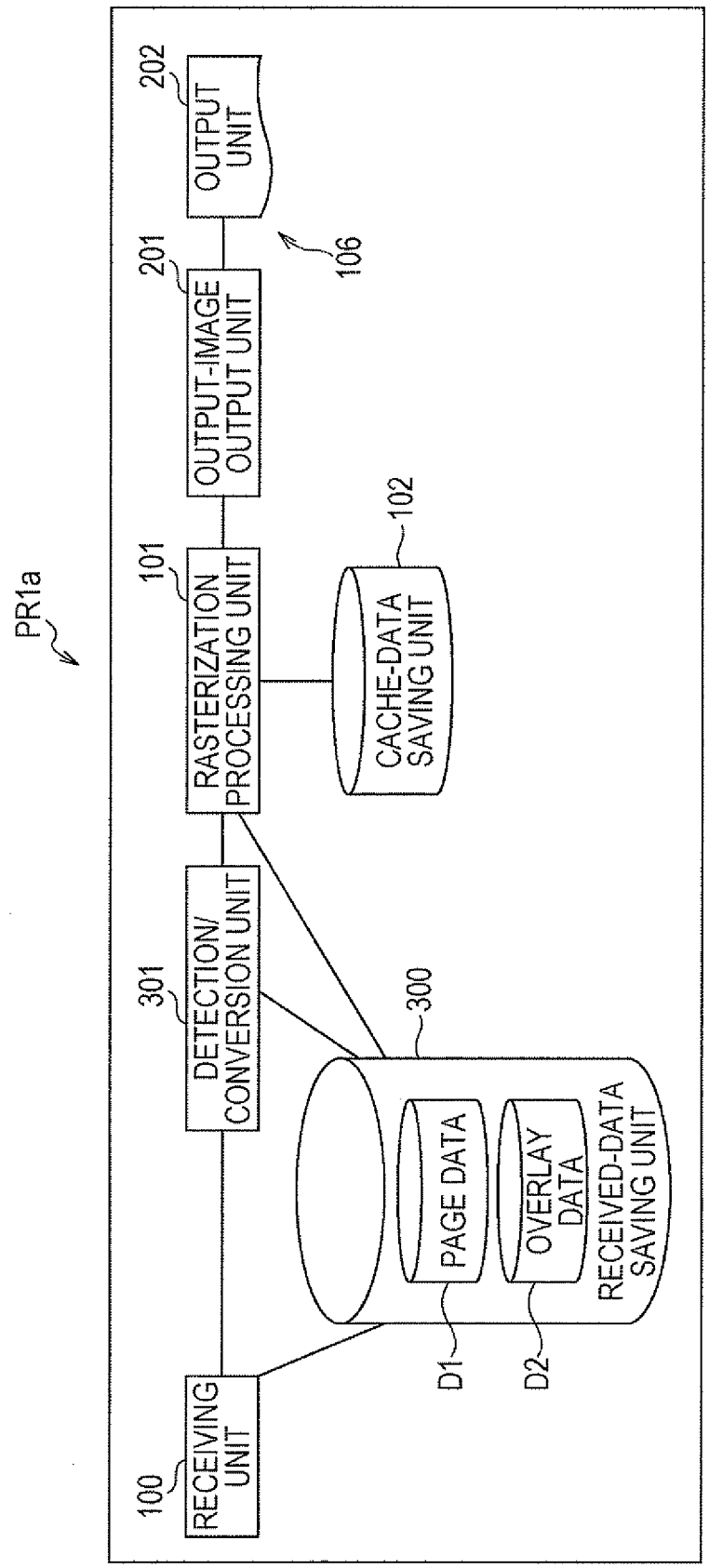
FIG. 5 is a block diagram illustrating an example of a configuration of an information processing apparatus according to a first exemplary embodiment.

Referring to FIG. 5, a received-data saving unit 300 that is configured so as to include a hard disk device or the like also serves as the page-data conversion and storage unit 104 illustrated in the functional block diagram (FIG. 1), and stores page data D1, overlay data D2, and so forth.

Furthermore, a detection/conversion unit 301 corresponds to the once-called-object detector 103, the object-call-command removing unit 105, the parameter conversion unit 107, and the overlay incorporating unit 108 that are illustrated in the functional block diagram (FIG. 1).

Moreover, the image forming unit 106 includes an output-image output unit 201 and an output unit 202.

Here, an operation of a portion of the information processing apparatus PR1*a* illustrated in FIG. 5 will be described.

First, the receiving unit 100 receives print data (print information). While receiving print data, the receiving unit 100 classifies the received print data into page data and object data such as overlay data, and stores the received print data in the received-data saving unit 300. In other words, a process of receiving data corresponding to the entirety of a job, and of classifying the data is performed.

The detection/conversion unit 301 reads commands included in the page data from the first one. If the read command is a command for a setting associated with printing (for example, a resolution setting, a font setting to be used, or a color setting to be used), setting information concerning the setting is registered in a primary memory (not illustrated). Furthermore, if old data already exists, overwriting is performed.

If the read command is a command to call an overlay, a table in which the number of times each overlay has been called is listed (see FIG. 9) is referred to.

Next, when the overlay that is called is already registered in the table, only the number of times the overlay has been called is updated. In a case of newly registering the overlay, a page number at a point in time when the overlay is called, and the setting information, which is already stored in the primary memory, concerning the settings of the page data at the point in time are registered in the table.

Next, when detection for the entirety of the job finishes, the detection/conversion unit 301 detects an overlay that is called only once.

Then, if an overlay that is called only once is found, a place at which a command to call the overlay exists is detected, and the command to call the overlay is removed by the object-call-command removing unit 105.

In other words, overlay data regarding the present overlay out of the overlay data that is saved in the received-data saving unit 300 is detected. If settings (a resolution setting, a font setting to be used, a color setting to be used, and so forth) of the overlay exist, the settings of the overlay are called. A process of adding, at the place at which the command to call the overlay that has been removed by the previous process has existed, a command to switch the current settings of the page data to the settings of the overlay is performed.

Next, commands contained in the overlay are read. Coordinates based on coordinate information included in a command contained in the overlay are transformed into page coordinates. Furthermore, a cutting-out region is set for each of rendered items so that a result obtained by performing the cutting-out process along the periphery of the cutting-out region coincides with a result obtained by performing the cutting-out process along the periphery of the overlay region of the overlay. The rendered items are continuously inserted into the page data.

Moreover, in a case in which there is a change of a font or color setting while the commands contained in the overlay being read, a command to change the font or color setting in accordance with the change is inserted into the page data.

Additionally, all of the commands contained in the overlay are converted if necessary, and inserted into the page data. Then, a command to switch the current settings to the settings based on the original setting information, which is registered in the primary memory, concerning the settings of the page data is inserted after the commands that have been inserted into the page data.

Then, the overlay data regarding the present overlay is removed from the received-data saving unit 300.

Next, whether another overlay that is called only once exists is checked.

Furthermore, all of overlays that are called only once are converted into page data. After that, automatically or in accordance with an instruction that is provided by an operator, the rasterization process using the rasterization processing unit 101 starts. Formation of an image onto a recording medium such as printing paper is performed by the image forming unit 106.

Figure 6:
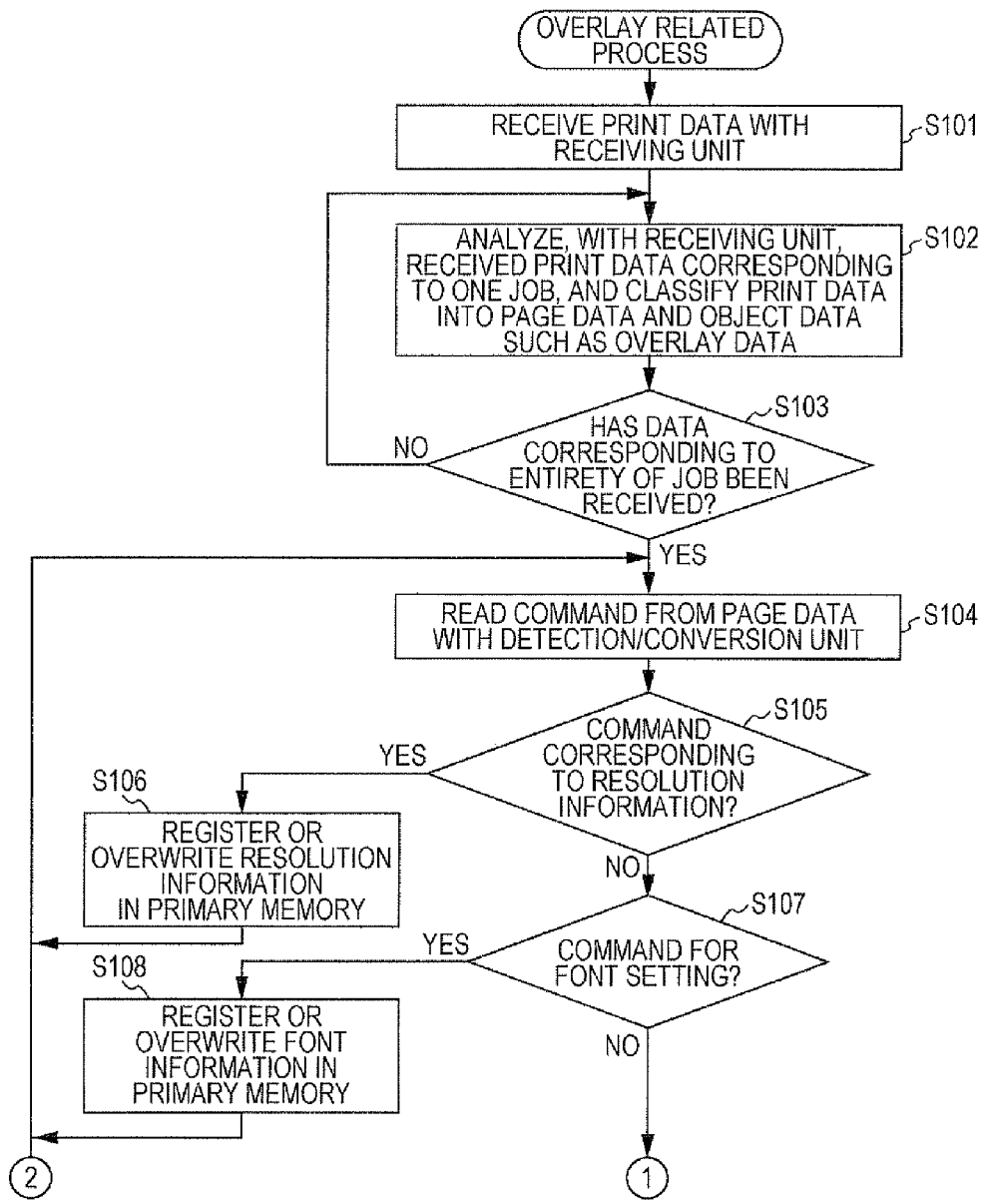
FIG. 6 is a flow diagram illustrating a procedure of an overlay related process.
Figure 7:
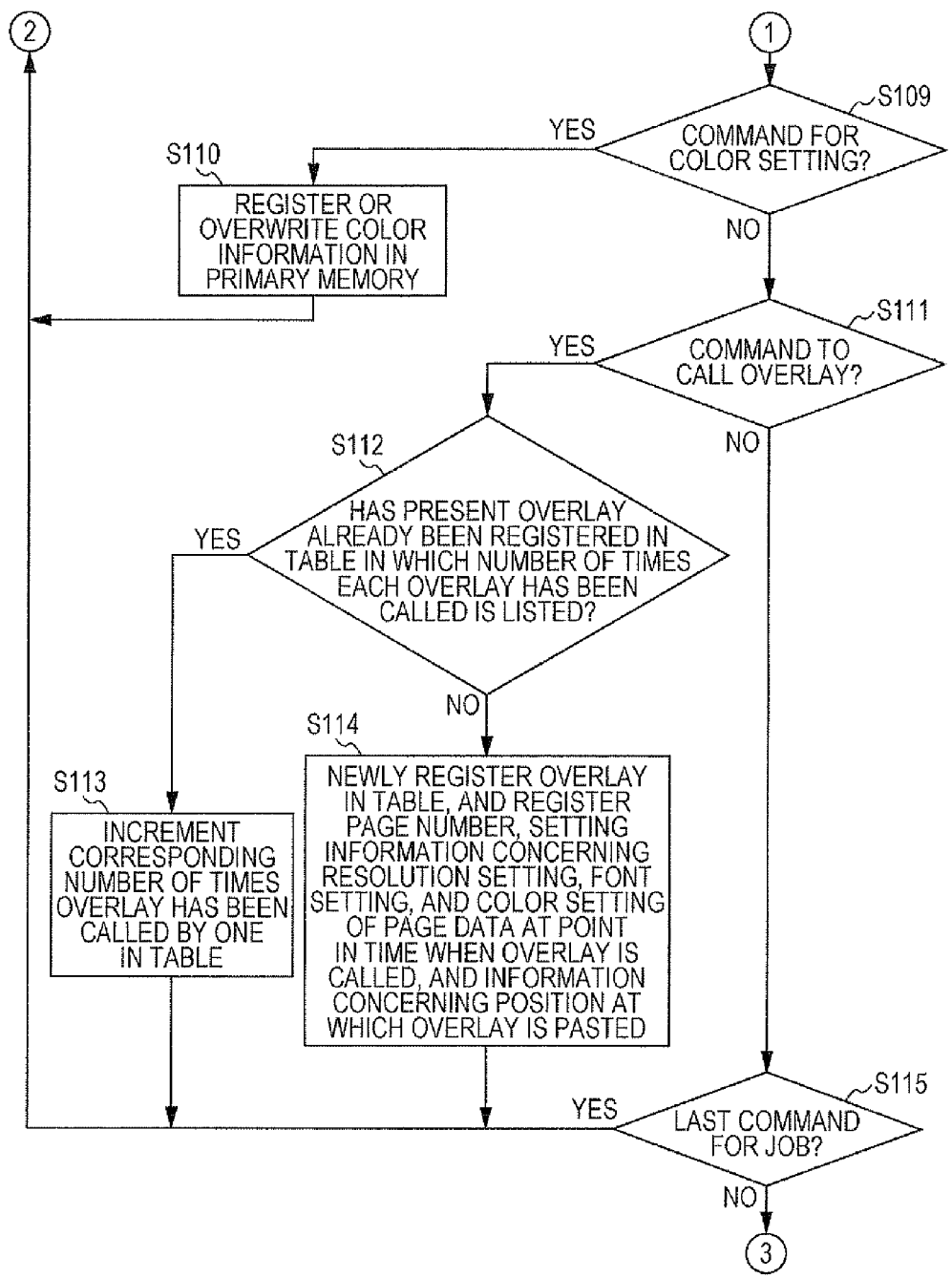
FIG. 7 is a flow diagram illustrating a continuation of the procedure of the overlay related process.

Next, a procedure of an overlay related process that is performed in the information processing apparatus PR1 according to the present exemplary embodiment will be described with reference to flow diagrams of FIGS. 6 to 8.

In step S101, the receiving unit 100 receives print data, and the process proceeds to step S102.

In step S102, the receiving unit 100 analyzes the received print data corresponding to one job, and classifies the print data into page data and object data such as overlay data. The process proceeds to step S103.

In step S103, whether or not data corresponding to the entirety of the job has been received is determined to obtain a result. When the result is "NO", the process returns to step S101. When the result is "YES", the process proceeds to step S104.

In step S104, the detection/conversion unit 301 reads a command from the page data. The process proceeds to step S105.

In step S105, whether or not the read command is a command for resolution information is determined to obtain a result. When the result is "YES", the process proceeds to step S106, and the resolution information is registered or overwritten in the primary memory. The process returns to step S104.

In contrast, when the result is "NO", the process proceeds to step S107. Whether or not the read command is a command for a font setting is determined to obtain a result. When the result is "YES", the process proceeds to step S108, and font information is registered or overwritten in the primary memory. The process returns to step S104.

Furthermore, when the result is "NO", the process proceeds to step S109, and whether or not the read command is a command for a color setting is determined to obtain a result. When the result is "YES", the process proceeds to step S110, and color information is registered or overwritten in the primary memory. The process returns to step S104.

Moreover, when the result is "NO", the process proceeds to step S111, and whether or not the read command is a command to call an overlay is determined to obtain a result. When the result is "YES", the process proceeds to step S112.

In step S112, whether or not the present overlay is already registered in the table in which the number of times each overlay has been called is listed (see FIG. 9) is determined to obtain a result. When the result is "YES", in step S113, the corresponding number of times the overlay has been called is incremented by one in the table, and the process returns to step S104.

Furthermore, when the result is "NO", the process proceeds to step S114, the overlay is newly registered in the table. A page number, setting information concerning a resolution setting, a font setting, and a color setting of the page data at a point in time when the overlay is called, and information concerning a position at which the overlay is pasted are registered. The process returns to step S104.

In contrast, when the result obtained by determination in step S111 is "NO", the process proceeds to step S115, and whether or not the read command is the last command for the job is determined to obtain a result. When the result is "YES", the process returns to step S104. When the result is "NO", the process proceeds to step S116.

In step S116, whether or not an overlay that is called only once exists is determined to obtain a result. When the result is "NO", the process proceeds to step S119. The rasterization process using the rasterization processing unit 101 starts. An image is output from the image forming unit 106. The process ends.

Furthermore, when the result is "YES", the process proceeds to step S117. The detection/conversion unit 301 obtains, on the basis of the number of times each overlay has been called, information concerning the overlay that is called only once. The process proceeds to step S118.

In step S118, the detection/conversion unit 301 accesses a place at which a command to call the overlay exists, and the command to call the overlay is removed by the object-call-command removing unit 105. The process proceeds step S120.

In step S120, the detection/conversion unit 301 accesses the overlay data, which is saved in the received-data saving unit 300, regarding the present overlay, and reads resolution information, font information, and color information concerning the settings of the overlay. A command to switch the current settings of the page data is added at the place at which the command to call the overlay has existed. The process proceeds to step S121.

In step S121, coordinates based on coordinate information included in a command contained in the overlay are transformed into page coordinates. A cutting-out region is set for each of rendered items so that a result obtained by performing the cutting-out process along the periphery of the cutting-out region coincides with a result obtained by performing the cutting-out process along the periphery of the overlay region of the overlay. The rendered items are inserted into the page data. Furthermore, in a case in which there is a change of a font or color setting in the overlay, a command to change the font or color setting is inserted into the page data. The process proceeds to step S122.

In step S122, whether or not all commands contained in the overlay have been converted is determined to obtain a result. When the result is "NO", the process returns to step S121. When the result is "YES", the process proceeds to step S123.

In step S123, a command to return the current settings to the original settings of the page data is inserted after the commands that have been converted from the overlay and that have been inserted. Furthermore, the overlay data regarding the present overlay is removed from the received-data saving unit 300. The process returns to step S116.

As described above, according to the overlay related process, an object (overlay) that is called only once for print information is converted into page data, and a command to call the object (overlay) that is called only once is removed. Thus, a cache region is efficiently utilized.

Second Exemplary Embodiment

Next, a second exemplary embodiment of the present invention will be described with reference to FIGS. 10 to 13.

An information processing apparatus M1 according to the second exemplary embodiment has a configuration such as the configuration illustrated in the block diagram of FIG. 1.

Figure 10:
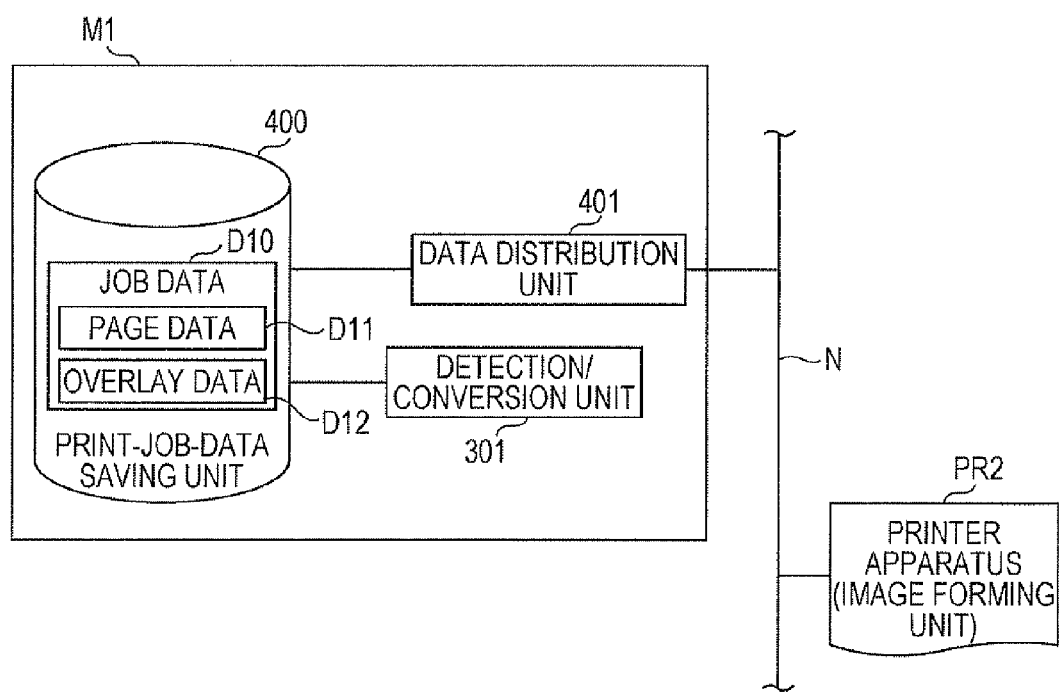
FIG. 10 is a block diagram illustrating an example of a configuration of an information processing apparatus according to a second exemplary embodiment.

Note that, in an example illustrated in FIG. 10, the image forming unit 106 is configured so as to include a printer PR2 that is connected to the information processing apparatus Ml via the network N.

Referring to FIG. 10, a print-job-data saving unit 400 configured so as to include a hard disk device or the like also serves as the page-data conversion and storage unit 104 illustrated in the functional block (FIG. 1), and stores page data D11, overlay data D12, and so forth.

Furthermore, a detection/conversion unit 301 corresponds to the once-called-object detector 103, the object-call-command removing unit 105, the parameter conversion unit 107, and the overlay incorporating unit 108 that are illustrated in the functional block (FIG. 1).

Moreover, a data distribution unit 401 that distributes print data to the printer PR2 via the network N is provided.

Here, an operation of a portion of the information processing apparatus Ml illustrated in FIG. 10 will be described.

First, the detection/conversion unit 301 detects, from the print-job-data saving unit 400, print job data that is a target.

The detection/conversion unit 301 reads commands included in page data from the first one. If the read command is a command for a setting associated with printing (for example, a resolution setting, a font setting to be used, or a color setting to be used), setting information concerning the setting is registered in a primary memory (not illustrated). Furthermore, if old data already exists, overwriting is performed.

Furthermore, if the read command is a command to call an overlay, a table in which the number of times each overlay has been called is listed (the above-described table illustrated in FIG. 9 or the like) is referred to. When the overlay that is called is already registered in the table, only the number of times the overlay has been called is updated. In a case of newly registering the overlay, a page number at a point in time when the overlay is called, and the setting information, which is already stored in the primary memory, concerning the settings of the page data at the point in time are registered in the table.

Furthermore, when detection for the entirety of a job finishes, the detection/conversion unit 301 detects an overlay that is called only once.

Then, if an overlay that is called only once is found, a place at which a command to call the overlay exists is detected, and the command to call the overlay is removed. Moreover, overlay data regarding the present overlay out of overlay data that is saved in the print-job-data saving unit 400 is detected. If settings (a resolution setting, a font setting to be used, a color setting to be used, and so forth) of the overlay exist, the settings of the overlay are called. A command to switch the current settings of the page data to the settings of the overlay is added at the place at which the command to call the overlay that has been removed by the previous process has existed.

Next, commands contained in the overlay are read. Coordinates based on coordinate information included in a command contained in the overlay are transformed into page coordinates. Furthermore, a cutting-out region is set for each of rendered items so that a result obtained by performing the cutting-out process along the periphery of the cutting-out region coincides with a result obtained by performing the cutting-out process along the periphery of the overlay region of the overlay. The rendered items are continuously inserted into the page data. Moreover, in a case in which there is a change of a font or color setting while the commands contained in the overlay being read, a command to change the font or color setting in accordance with the change is inserted into the page data.

Next, all of the commands contained in the overlay are converted if necessary, and inserted into the page data. Then, a command to switch the current settings to the settings based on the original setting information, which is registered in the primary memory, concerning the settings of the page data is inserted after the commands that have been inserted into the page data.

Then, overlay data regarding the present overlay is removed from the print-job-data saving unit 400. Whether another overlay that is called only once exists is checked. All overlays that are called only once are converted into page data, and the process ends.

Figure 11:
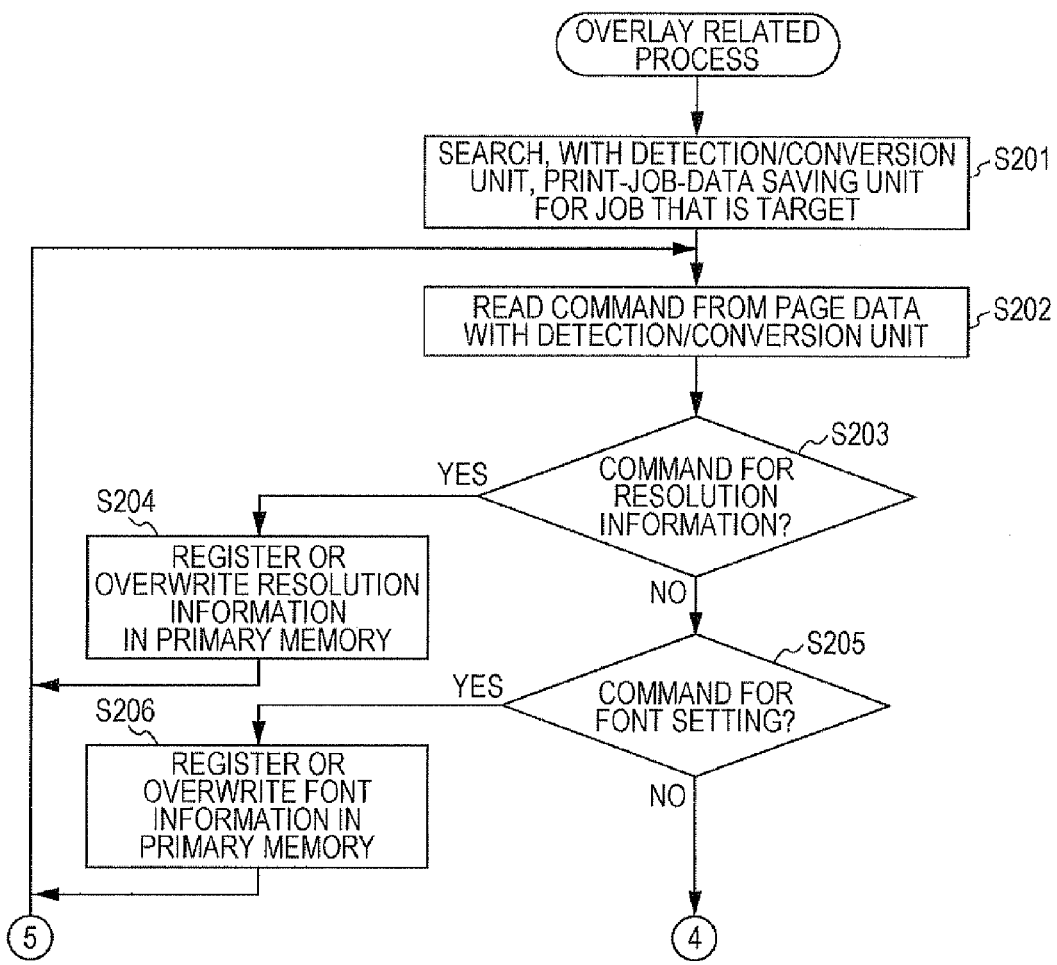
FIG. 11 is a flow diagram illustrating a procedure of an overlay related process.
Figure 12:
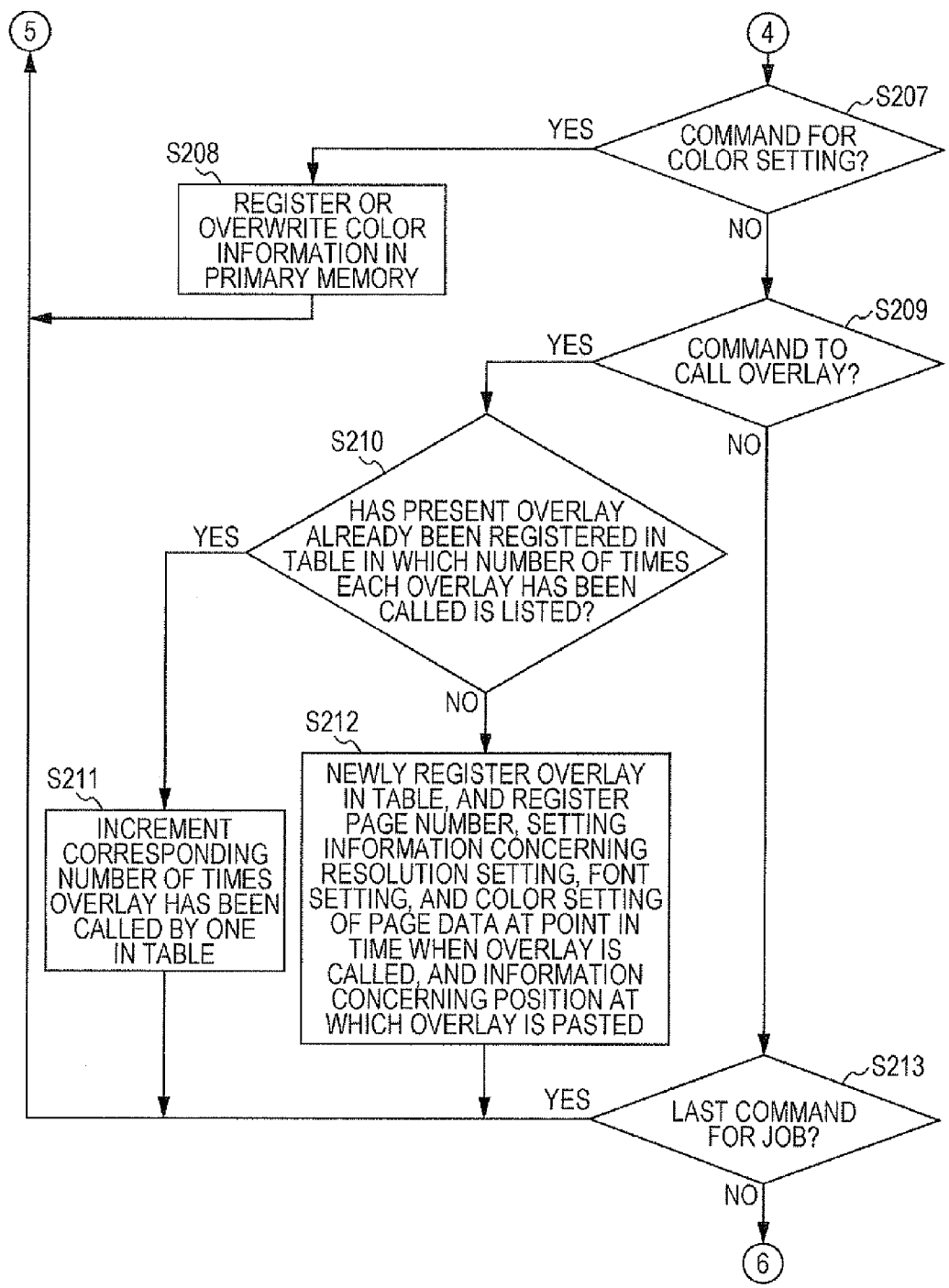
FIG. 12 is a flow diagram illustrating a continuation of the procedure of the overlay related process.
Figure 13:
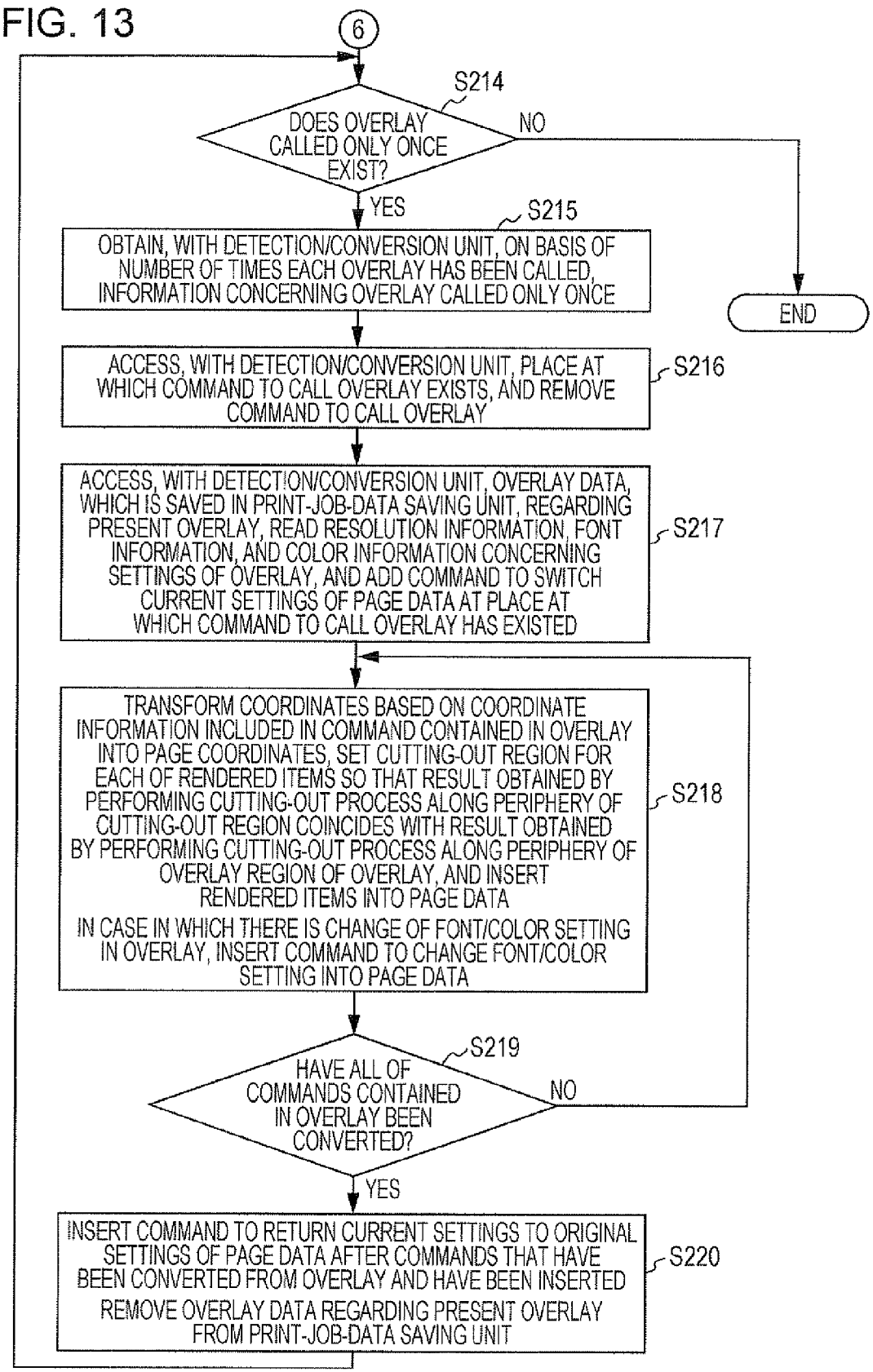
FIG. 13 is a flow diagram illustrating a continuation of the procedure of the overlay related process.

Next, a procedure of an overlay related process that is performed in the information processing apparatus Ml according to the present exemplary embodiment will be described with reference to flow diagrams of FIGS. 11 to 13.

In step S201, the detection/conversion unit 301 searches the print-job-data saving unit 400 for print job data that is a target. The process proceeds to step S202.

In step S202, the detection/conversion unit 301 reads a command from page data. The process proceeds to step S203.

In step S203, whether or not the read command is a command for resolution information is determined to obtain a result. When the result is "YES", the process proceeds to step S204, and the resolution information is registered or overwritten in the primary memory. The process returns to step S202.

In contrast, when the result is "NO", the process proceeds to step S205. Whether or not the read command is a command for a font setting is determined to obtain a result. When the result is "YES", the process proceeds to step S206, and font information is registered or overwritten in the primary memory. The process returns to step S202.

Furthermore, when the result is "NO", the process proceeds to step S207, and whether or not the read command is a command for a color setting is determined to obtain a result. When the result is "YES", the process proceeds to step S208, and color information is registered or overwritten in the primary memory. The process returns to step S202.

Moreover, when the result is "NO", the process proceeds to step S209, and whether or not the read command is a command to call an overlay is determined to obtain a result. When the result is "YES", the process proceeds to step S210.

In step S210, whether or not the present overlay is already registered in the table in which the number of times each overlay has been called is listed (see FIG. 9) is determined to obtain a result. When the result is "YES", in step S211, the corresponding number of times the overlay has been called is incremented by one in the table, and the process returns to step S202.

Furthermore, when the result is "NO", the process proceeds to step S212, the overlay is newly registered in the table. A page number, setting information concerning a resolution setting, a font setting, and a color setting of the page data at a point in time when the overlay is called, and information concerning a position at which the overlay is pasted are registered. The process returns to step S202.

In contrast, when the result obtained by determination in step S209 is "NO", the process proceeds to step S213, and whether or not the read command is the last command for a job is determined to obtain a result. When the result is "YES", the process returns to step S202. When the result is "NO", the process proceeds to step S214.

In step S214, whether or not an overlay that is called only once exists is determined to obtain a result. When the result is "NO", the process ends.

Furthermore, when the result is "YES", the process proceeds to step S215. The detection/conversion unit 301 obtains, on the basis of the number of times each overlay has been called, information concerning the overlay that is called only once. The process proceeds to step S216.

In step S216, the detection/conversion unit 301 accesses a place at which a command to call the overlay exists, and the command to call the overlay is removed by the object-call-command removing unit 105. The process proceeds step S217.

In step S217, the detection/conversion unit 301 accesses overlay data, which is saved in the print-job-data saving unit 400, regarding the present overlay, and reads resolution information, font information, and color information concerning the settings of the overlay. A command to switch the current settings of the page data is added at the place at which the command to call the overlay has existed. The process proceeds to step S218.

In step S218, coordinates based on coordinate information included in a command contained in the overlay are transformed into page coordinates. A cutting-out region is set for each of rendered items so that a result obtained by performing the cutting-out process along the periphery of the cutting-out region coincides with a result obtained by performing the cutting-out process along the periphery of the overlay region of the overlay. The rendered items are inserted into the page data. Furthermore, in a case in which there is a change of a font or color setting in the overlay, a command to change the font or color setting is inserted into the page data. The process proceeds to step S219.

In step S219, whether or not all commands contained in the overlay have been converted is determined to obtain a result. When the result is "NO", the process returns to step S218. When the result is "YES", the process proceeds to step S220.

In step S220, a command to return the current settings to the original settings of the page data is inserted after the commands that have been converted from the overlay and that have been inserted. Furthermore, the overlay data regarding the present overlay is removed from the print-job-data saving unit 400. The process returns to step S214.

As described above, according to the overlay related process, an object (overlay) that is called only once for print information is converted into page data, and a command to call the object (overlay) that is called only once is removed. Thus, a cache region is efficiently utilized.

The invention made by the present inventors has been specifically described above on the basis of the exemplary embodiments. However, it should be understood that the exemplary embodiments disclosed in the present specification are only examples in all respects, and that the present invention is not limited to the disclosed techniques. In other words, the technical scope of the present invention should not be construed restrictively on the basis of the description in the exemplary embodiments, and should be construed on the basis of the description in the claims. Techniques equivalent to the techniques described in the claims and all changes that may be made in the claims fall within the technical scope of the present invention.

Furthermore, in a case of using a program, the program may be provided via a network. Alternatively, the program may be stored on a recording medium such as a compact disc read-only memory (CD-ROM), and may be provided.

In other words, a predetermined program including an image processing program not only may be recorded on a storage device such as a hard disk serving as a recording medium, but also may be provided in the following manner.

For example, the predetermined program may be stored in a read-only memory (ROM). A central processing unit (CPU) may load the predetermined program into a main memory from the ROM, and may execute the program.

Furthermore, the predetermined program may also be stored on a computer-readable recording medium such as a digital versatile disc read-only memory (DVD-ROM), a CD-ROM, a magneto-optical (MO) disk, or a flexible disk, and may be distributed.

Moreover, an image forming apparatus or the like may be connected to a server device or a host computer via a communication line (for example, the Internet). The image forming apparatus or the like may download the predetermined program from the server device or the host computer, and, then, may execute the predetermined program. In this case, the predetermined program may be downloaded to a memory such as a random access memory (RAM) or to a storage device (a recording medium) such as a hard disk.

The information processing apparatus, the information processing method, and the computer readable medium storing a program according to the exemplary embodiments of the present invention may be applied to printers, multifunction devices, and so forth.

What is claimed is:

1. An information processing apparatus comprising:
a receiving unit that receives print information described in a page description language, wherein the received print information includes a page data and an overlay data, and the page data includes a command to call an overlay;
a rasterization processing unit that performs a rasterization process of converting the print information into bitmap data;
a saving unit that saves the bitmap data, which has been generated using the rasterization process, as cache data for each of objects included in the print information;
a detector that detects, among the objects included in the print information, an object which is identified as being printed only once;
a conversion unit that converts, in accordance with a result of detection performed by the detector, the identified object as being printed only once for the print information into the page data, the conversion unit converting the page data by removing a command to call an overlay performing only once in the page data and adding the overlay data corresponding to the command to call the overlay at a place where the command to call the overlay has existed;
a storage unit that stores the page data which has been obtained by conversion performed by the conversion unit; and
a removing unit that removes, in accordance with a result of detection performed by the detector, only bitmap data saved as cache data from the saving unit, for the object which is identified as being printed only once for the print information.

2. The information processing apparatus according to claim 1, wherein the conversion unit includes
a parameter conversion part that converts, when the identified object is an object that is to be subjected to form overlay printing in which form data and print information are superimposed on each other, a parameter associated with the object into a parameter compatible with page data, and
an incorporating part that incorporates, using the parameter which has been obtained by conversion performed by the parameter conversion part and which is compatible with page data, the object into page data.

3. The information processing apparatus according to claim 2, wherein, when the print information satisfies a pre-set condition, for the print information, the incorporating part does not incorporate the object into page data, and the removing unit does not remove the command to print the identified object.

4. The information processing apparatus according to claim 3, wherein the pre-set condition is a condition where the number of pages included in the print information is equal to or smaller than a pre-set threshold.

5. The information processing apparatus according to claim 2, wherein, in a case of pasting the object at a position that is offset from an origin of a page, the incorporating part offsets a coordinate position that is specified in a render command contained in the object, and incorporates the object into the page data.

6. The information processing apparatus according to claim 2,
wherein the object has size information, and
wherein, when development of the object in a page is performed, in a case of performing a cutting-out process of cutting out rendered items contained in the object so as to have sizes in which the rendered items are rendered in the object, the parameter conversion part sets, in the page data, for each of the rendered items contained in the object, a command to cut out the rendered item so as to have the size in which the rendered item is rendered in the object, and converts a command contained in the object into page data.

7. The information processing apparatus according to claim 2, wherein, when a font setting of the page data and a font setting of the object are different from each other, the parameter conversion part and the incorporating part incorporate, into the page data, a setting with which the font setting of the page data is switched to the font setting of the object, convert a command contained in the object into page data, and incorporate, into the page data, a command to change from the font setting of the overlay back to the font setting of the page data.

8. The information processing apparatus according to claim 2, wherein, when a color setting of the page data and a color setting of the object are different from each other, the parameter conversion part and the incorporating part incorporate, into the page data, a setting with which the color setting of the page data is switched to the color setting of the object, convert a command contained in the object into page data, and incorporate, into the page data, a command to change from the color setting of the overlay back to the color setting of the page data.

9. The information processing apparatus according to claim 1, further comprising an overlay incorporating unit that offsets a coordinate position that is specified in a render command contained in the overlay, and incorporates the overlay into page data.

10. An image processing method comprising:
receiving print information described in a page description language, wherein the received print information includes a page data and an overlay data, and the page data includes a command to call an overlay;
performing a rasterization process of converting the print information into bitmap data;
saving the bitmap data, which has been generated using the rasterization process, as cache data for each of objects included in the print information;
detecting, among the objects included in the print information, an object that is identified as being printed only once to obtain a detection result;
converting, in accordance with the detection result, the identified object as being printed only once for the print information into page data, and converting the page data by removing a command to call an overlay performing only once in the page data and adding the overlay data corresponding to the command to call the overlay at a place where the command to call the overlay has existed;
storing the page data; and
removing in accordance with a result of the detection only bitmap data saved as cache data, for the object which is identified as being printed only once for the print information.

11. A non-transitory computer readable medium storing a program causing a computer to execute a process, the process comprising:
receiving print information described in a page description language, wherein the received print information includes a page data and an overlay data, and the page data includes a command to call an overlay;
performing a rasterization process of converting the print information into bitmap data;

saving the bitmap data, which has been generated using the rasterization process, as cache data for each of objects included in the print information;

detecting, among the objects included in the print information, an object that is identified as being printed only once to obtain a detection result;

converting, in accordance with the detection result, the identified object as being printed only once for the print information into page data, and converting the page data by removing a command to call an overlay performing only once in the page data and adding the overlay data corresponding to the command to call the overlay at a place where the command to call the overlay has existed;

storing the page data; and removing in accordance with a result of the detection only bitmap data saved as cache data, for the object which is identified as being printed only once for the print information.

* * * * *